United States Patent
Misske et al.

(10) Patent No.: US 11,174,333 B2
(45) Date of Patent: Nov. 16, 2021

(54) MACROMONOMERS CONTAINING POLYISOBUTENE GROUPS, AND HOMOPOLYMERS OR COPOLYMERS THEREOF

(71) Applicant: BASF SE, Ludwigshafen am Rhein (DE)

(72) Inventors: Andrea Misske, Ludwigshafen am Rhein (DE); Anja Thomas, Ludwigshafen am Rhein (DE); Christoph Fleckenstein, Ludwigshafen am Rhein (DE); Friederike Fleischhaker, Ludwigshafen am Rhein (DE); Szilard Csihony, Ludwigshafen am Rhein (DE); Matthias Gerst, Ludwigshafen am Rhein (DE); Stephan Moebius, Ludwigshafen am Rhein (DE); Ulrike Licht, Ludwigshafen am Rhein (DE); Andreas Schwarz, Ludwigshafen am Rhein (DE); Eric Neuhaus, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 291 days.

(21) Appl. No.: 16/322,612

(22) PCT Filed: Jul. 26, 2017

(86) PCT No.: PCT/EP2017/068842
§ 371 (c)(1),
(2) Date: Feb. 1, 2019

(87) PCT Pub. No.: WO2018/024563
PCT Pub. Date: Feb. 8, 2018

(65) Prior Publication Data
US 2019/0169346 A1 Jun. 6, 2019

(30) Foreign Application Priority Data
Aug. 5, 2016 (EP) .................................... 16183034

(51) Int. Cl.
C08F 290/04 (2006.01)
C08F 120/30 (2006.01)
C08F 2/22 (2006.01)
C08F 220/30 (2006.01)
C08F 220/14 (2006.01)

(52) U.S. Cl.
CPC ............ C08F 290/044 (2013.01); C08F 2/22 (2013.01); C08F 120/30 (2013.01); C08F 220/14 (2013.01); C08F 220/30 (2013.01); C08F 290/042 (2013.01); C08F 290/046 (2013.01)

(58) Field of Classification Search
CPC ....... C08F 10/10; C08F 110/10; C08F 210/10
See application file for complete search history.

(56) References Cited

U.S. PATENT DOCUMENTS

| | | | |
|---|---|---|---|
| 3,278,457 A | 10/1966 | Milgrom | |
| 3,887,609 A | 6/1975 | Strehlke et al. | |
| 4,851,568 A | 7/1989 | Hurtel et al. | |
| 4,859,210 A | 8/1989 | Franz et al. | |
| 5,731,379 A | 3/1998 | Kennan et al. | |
| 5,783,513 A | 7/1998 | Combs et al. | |
| 6,437,173 B1 | 8/2002 | Hurtel et al. | |
| 7,435,273 B2 | 10/2008 | Lange et al. | |
| 7,816,485 B2 | 10/2010 | Hoeffer et al. | |
| 8,067,349 B2 | 11/2011 | Stoehr et al. | |
| 2007/0129564 A1 | 6/2007 | Schwalm et al. | |
| 2014/0243444 A1* | 8/2014 | Ikari | C08F 8/00 522/28 |
| 2015/0315309 A1 | 11/2015 | Lange et al. | |
| 2018/0226664 A1* | 8/2018 | Soga | C08F 8/00 |
| 2018/0362676 A1* | 12/2018 | Ikari | C08F 110/10 |

FOREIGN PATENT DOCUMENTS

| | | |
|---|---|---|
| DE | 2008618 A1 | 9/1970 |
| DE | 2317226 A1 | 10/1974 |
| DE | 102004036930 A1 | 3/2006 |
| EP | 277345 A1 | 8/1988 |
| EP | 298867 | 1/1989 |
| EP | 0832960 A1 | 4/1998 |
| EP | 960877 | 12/1999 |
| EP | 1899393 A1 | 3/2008 |
| EP | 2762506 A1 | 8/2014 |
| GB | 1292383 A | 10/1972 |
| JP | 2013-216782 A | 10/2013 |
| WO | WO-02059237 A2 | 8/2002 |
| WO | WO-04092227 A1 | 10/2004 |
| WO | WO-2005082828 A1 | 9/2005 |
| WO | WO-2007003238 A1 | 1/2007 |
| WO | WO-2009080380 A2 | 7/2009 |
| WO | WO-2014090672 A1 | 6/2014 |
| WO | WO-2016046195 A1 | 3/2016 |
| WO | WO-2017099043 A1 * | 6/2017 ............ C08F 110/10 |

OTHER PUBLICATIONS

International Preliminary Examination Report for PCT/EP2017/068842 dated Jul. 5, 2018.
International Search Report for PCT/EP2017/068842 dated Sep. 18, 2017.
Written Opinion of the International Searching Authority for PCT/EP2017/068842 dated Sep. 18, 2017.
European Search Report for EP Patent Application No. 16183034.4, dated Jan. 25, 2017, 3 pages.
Iván, et al., "New telechelic polymers and sequential copolymers by polyfunctional initiatortransfer agents (inifers). VII. Synthesis and characterization of α,ωdi(hydroxy)polyisobutylene", Journal of Polymer Science: Polymer Chemistry Edition, vol. 18, Issue 11, Nov. 1980, pp. 3177-3191.

(Continued)

Primary Examiner — Mark S Kaucher
(74) Attorney, Agent, or Firm — Faegre Drinker Biddle & Reath LLP

(57) ABSTRACT

The present invention describes novel macromonomers containing polyisobutene groups and homo- or copolymers thereof.

20 Claims, No Drawings

(56) References Cited

OTHER PUBLICATIONS

Maenz, et al., "Macromonomers based on lowmolecularweight polyisobutenes", Macromolecular Materials and Engineering, vol. 242, Issue 1, Nov. 1996, pp. 183-197.

Malins, et al., "Controlled synthesis of amphiphilic block copolymers based on poly(isobutylene) macromonomers", Journal of Polymer Science Part A: Polymer Chemistry, vol. 54, Issue 5, 2015, pp. 634-643.

* cited by examiner

MACROMONOMERS CONTAINING POLYISOBUTENE GROUPS, AND HOMOPOLYMERS OR COPOLYMERS THEREOF

CROSS-REFERENCE TO RELATED APPLICATIONS

This application is a national stage application (under 35 U.S.C. § 371) of PCT/EP2017/068842, filed Jul. 26, 2017, which claims benefit of European Application No. 16183034.4, filed Aug. 5, 2016, both of which are incorporated herein by reference in their entirety.

The present invention describes novel macromonomers containing polyisobutene groups and homo- or copolymers thereof.

Macromonomers bearing polyisobutene groups, based, for example, on polyisobutenylsuccinic anhydride (PIBSA), are already known, for example from WO 04/092227. Here, however, in the preparation of the polyisobutenylsuccinic anhydride, structures having multiple functionalizations with succinic anhydride may be present, which, in a subsequent reaction with (meth)acrylic acid derivatives, afford monomers having a (meth)acrylic acid functionality >1 and hence lead to a fraction in the reaction mixture having crosslinking macromonomer structures. Furthermore, the reaction of PIBSA with alcohols gives rise to a free acid group which can additionally reduce the hydrophobicity of the macromonomers and lead to subsequent side reactions.

Polyisobutenes terminated by an —OH function are valuable intermediates for preparation of monofunctional macromers or macromonomers. Kennedy and Ivan made the achievement of being the first to publish a synthesis route to such compounds via borane addition (Ivan, Kennedy, Chang; J. Polym. Sci. Polym. Chem. Ed. 18, 3177 (1980)). The use of boranes for preparation of industrial polymers is too complex; see also WO 14/090672.

The use of polyisobutenyl alcohols that have been prepared via hydroformylation is unsuitable for use in macromonomer preparation owing to the long reaction time at high temperatures in the presence of rhodium catalysts or cobalt catalysts and the comparatively low degree of functionalization with alcohol functionalities; see, for example, EP 277345.

Macromonomers are also obtained by conversion of polyisobutene, for example to polyisobuteneamines (commercially available as Kerocom® PIBA from BASF) and then further to (meth)acrylamides. However, these comprise high-boiling solvents (up to 35%) and are therefore unusable for some solvent-free applications.

The use of the macromonomer structures based on the three precursors specified here is already described in EP 1899393 and once more illustrates the low degree of functionalization (<80%) of the macromonomers obtained therefrom.

K. Maenz, D. Stadermann, Angewandte Makromolekulare Chemie, 242 (1996) 183-97 discloses esterifying phenols bearing polyisobutene groups with methacryloyl chloride.

E. L. Malins, C. Waterson, C. R. Becer, J. Polym. Sc., Part A: Polymer Chemistry 2016, 54, 634-643 discloses esterifying phenols bearing polyisobutene groups with acryloyl chloride and homo- or copolymerizing them.

WO 14/090672 discloses either ethoxylating phenols bearing polyisobutene groups or esterifying them with (meth) acrylic acid. The products obtained can find use in the production of adhesives, adhesive raw materials, fuel and lubricant additives, as elastomers or as base constituent of sealants and sealing compounds.

A disadvantage of the (meth)acrylates thus obtained is that the preparation thereof requires the reaction of the free phenol with (meth)acryloyl chloride or (meth)acrylic anhydride. Reaction with acryloyl chloride is also disclosed explicitly in one example in WO 14/90672. The esterification with (meth)acrylic acid or transesterification with (meth)acrylic esters described in general terms in the description of WO 14/90672 affords the products in only poor yields.

Moreover, the (meth)acrylates thus obtainable are unstable in the presence of acids, for example comonomers bearing acid groups, under the polymerization conditions and lead to inhibition of polymerization by release of phenol and highly colored product mixtures.

EP 2762506 A1 discloses (meth)acryloyl-terminated polyisobutenyl polymers. The declared aim of EP 2762506 A1 is to prepare crosslinkable macromolecules, preferably having a functionality of 2 or 3. The macromolecules disclosed explicitly in the examples have a functionality of 1.9 or higher. This results in crosslinking under polymerization conditions.

Moreover, the macromolecules disclosed therein are prepared by a cationic polymerization of correspondingly functionalized starter molecules, and the polyfunctionalized polyisobutene polymers bearing a chlorine atom at each chain end that are obtained in this way are coupled to a (meth)acryloyl-substituted phenol by means of a Friedel-Crafts alkylation.

The result of this mode of preparation is that the products, as a result of the preparation, have a distinct chlorine content, reported in the examples as 79 to 85 ppm.

EP 832960 A1 discloses alkoxylating polyisobutenyl-substituted phenols with carbonates or alternatively with alkylene oxides.

The products described are solely monoalkoxylated and not polyalkoxylated products; more particularly, there is no discussion of the distribution of the polyalkoxylated products by this process.

It was an object of the present invention to provide homogeneously monofunctional compounds with which a high proportion of structural units of phenols bearing polyisobutene groups can be introduced into polymers. These compounds are to be stable under polymerization conditions and more readily obtainable than the prior art compounds mentioned, and are to have a lower halogen content than disclosed in the examples of EP 2762506 A1.

This object is achieved by compounds (A) of the formula (I)

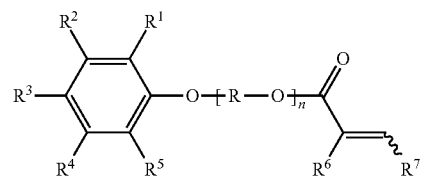

in which $R^1$ to $R^5$ are each independently selected from the group consisting of hydrogen, $C_1$-$C_{20}$-alkyl, $C_1$-$C_{20}$-alkyloxy and $C_8$-$C_{3500}$-polyisobutyl and $C_8$-$C_{3500}$-polyisobutenyl, R is an alkylene group having 2 to 10, preferably 2 to 6 and more preferably 2 to 4 carbon atoms, $R^6$ is hydrogen or methyl,
$R^7$ is hydrogen, methyl or $COOR^8$,
$R^8$ is hydrogen or $C_1$-$C_{20}$-alkyl and
n is a positive integer from 1 to 50,
with the proviso that
at least one of the $R^1$ to $R^5$ radicals is a $C_8$-$C_{3500}$-polyisobutyl or $C_8$-$C_{3500}$-polyisobutenyl.

The invention further provides polymers comprising, in polymerized form,
at least one compound (A) of the formula (I)

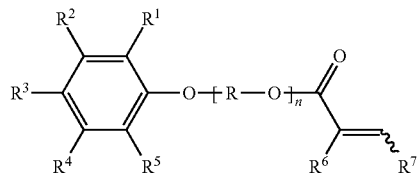

in which
$R^1$ to $R^5$ are each independently selected from the group consisting of hydrogen, $C_1$-$C_{20}$-alkyl, $C_1$-$C_{20}$-alkyloxy and $C_8$-$C_{3500}$-polyisobutyl and $C_8$-$C_{3500}$-polyisobutenyl,
R is an alkylene group having 2 to 10, preferably 2 to 6 and more preferably 2 to 4 carbon atoms,
$R^6$ is hydrogen or methyl,
$R^7$ is hydrogen, methyl or $COOR^8$,
$R^8$ is hydrogen or $C_1$-$C_{20}$-alkyl and
n is a positive integer from 1 to 50,
with the proviso that
at least one of the $R^1$ to $R^5$ radicals is a $C_8$-$C_{3500}$-polyisobutyl or $C_8$-$C_{3500}$-polyisobutenyl, and optionally at east one monomer (B) selected from the group consisting of
(B1) (meth)acrylates other than (A),
(B2) fumaric acid derivatives and maleic acid derivatives other than (A),
(B3) alkyl vinyl ethers
(B4) styrene and α-methylstyrene
(B5) acrylonitrile
(B6) vinyl alkanoates and
(B7) (meth)acrylamides,
In the above,
$C_1$-$C_{20}$-alkyl denotes, for example, methyl, ethyl, iso-propyl, n-propyl, n-butyl, iso-butyl, sec-butyl and tert-butyl, n-pentyl, 2-pentyl, 3-pentyl, 2-methylbutyl, 3-methylbutyl, 3-methylbut-2-yl, 2-methylbut-2-yl, 2,2-dimethylpropyl, n-hexyl, 2-hexyl, 3-hexyl, 2-methylpentyl, 2-methylpent-3-yl, 2-methylpent-2-yl, 2-methylpent-4-yl, 3-methylpent-2-yl, 3-methylpent-3-yl, 3-methylpentyl, 2,2-dimethylbutyl, 2,2-dimethylbut-3-yl, 2,3-dimethylbut-2-yl, 2,3-dimethylbutyl, 2-ethylhexyl, n-octyl, 2-propylheptyl, n-decyl, n-dodecyl, n-tetradecyl, n-hexadecyl, n-octadecyl and eicosyl, preferably methyl, ethyl, n-butyl, iso-propyl, tert-butyl, 2-ethylhexyl and 2-propylheptyl and more preferably methyl, ethyl, n-butyl, iso-propyl or tert-butyl, even more preferably methyl, ethyl or n-butyl, particularly methyl or ethyl, especially methyl;
$C_1$-$C_{20}$-alkyloxy denotes, for example, oxygen radicals substituted by $C_1$-$C_{20}$-alkyl groups, preferably methoxy, ethoxy, iso-propyloxy, n-propyloxy, n-butyloxy, iso-butyloxy, sec-butyloxy and tert-butyloxy, more preferably methoxy, ethoxy, n-butyloxy, iso-propyloxy and tert-butyloxy and even more preferably methoxy;
an alkylene group having 2 to 10 carbon atoms denotes 1,2-ethylene, 1,2-propylene, 1,3-propylene, 1,2-butylene, 1,3-butylene, 1,4-butylene, 1-phenyl-1,2-ethylene and 2-phenyl-1,2-ethylene, preferably 1,2-ethylene, 1,2-propylene and 1,2-butylene;

$C_8$-$C_{3500}$-polyisobutyl and $C_8$-$C_{3500}$-polyisobutenyl denote radicals obtainable by addition of polyisobutene comprising 8 to 3500 carbon atoms onto aromatic systems.

The $C_8$-$C_{3500}$-polyisobutyl and $C_8$-$C_{3500}$-polyisobutenyl radicals may be based here on basically any standard and commercially available polyisobutene which is introduced into the synthesis of the compounds of the formula (I) in a suitable manner. Such a polyisobutene preferably has a number-average molecular weight $M_n$ of at least 200. Preference is given to polyisobutenes having a number-average molecular weight $M_n$ in the region of at least 500, more preferably of at least 700 and most preferably of at least 900 g/mol.

It is possible to use polyisobutenes having a number-average molecular weight $M_n$ in the region of up to 50 000, more preferably up to 40 000 and most preferably up to 35 000 g/mol.

In a preferred embodiment, the number-average molecular weight $M_n$ of the polyisobutenes may be up to 30 000, more preferably up to 20 000 and most preferably up to 10 000 g/mol.

In a preferred embodiment, the number-average molecular weight $M_n$ of the polyisobutenes may be from 700 to 2500 and more preferably 900 to 1100 g/mol.

In the context of the present invention, the term "polyisobutene" also includes oligomeric isobutenes such as dimeric, trimeric, tetrameric, pentameric, hexameric and heptameric isobutene.

Preferably, the $C_8$-$C_{3500}$-polyisobutyl and $C_8$-$C_{3500}$-polyisobutenyl radicals incorporated into the compounds of the formula (I) derive from "high-reactivity" polyisobutene. "High-reactivity" polyisobutenes differ from other polyisobutenes by the content of terminal double bonds. For instance, high-reactivity polyisobutenes comprise at least 50 mol % of terminal double bonds, based on the total number of polyisobutene macromolecules. Particular preference is given to polyisobutenes having at least 60 mol % and especially having at least 80 mol % of terminal double bonds, based on the total number of polyisobutene macromolecules. The terminal double bonds may be either vinyl double bonds [—CH=C(CH$_3$)$_2$] (β-olefin) or vinylidene double bonds [—CH—C(=CH$_2$)—CH$_3$] (α-olefin), preferably α-olefins. The essentially homopolymeric polyisobutenyl radicals also have homogeneous polymer structures. In the context of the present invention, this is understood to mean those polyisobutene systems that are formed to an extent of at least 85% by weight, preferably to an extent of at least 90% by weight and more preferably to an extent of at least 95% by weight from isobutene units of the repeat unit [—CH$_2$C(CH$_3$)$_2$—].

In the present document, a distinction is made between polyisobutyl and polyisobutenyl radicals, where the polyisobutyl radicals are essentially free of double bonds and the polyisobutenyl radicals generally bear at least one double bond per radical.

The Brønsted or Lewis acid-catalyzed addition of polyisobutene onto aromatic systems usually proceeds with reaction of the double bond and therefore affords essentially double bond-free polyisobutyl radicals, "Essentially double bond-free" means that not more than 25% of all radicals bear a double bond, preferably not more than 15%, more preferably not more than 10% and most preferably not more than 5%.

Polyisobutyl radicals are preferred over the polyisobutenyl radicals.

A further preferred feature of the polyisobutenes on which the inventive compounds of the formula (I) can be based is that they are terminated to an extent of at least 15% by weight, especially to an extent of at least 50% by weight, in particular to an extent of at least 80% by weight, by a tert-butyl group [—CH$_2$C(CH$_3$)$_3$].

In addition, the polyisobutenes that preferably serve as the basis for the inventive compounds of the formula (I) preferably have a polydispersity index (PDI) of 1.05 to 10, preferably of 1.05 to 3.0, especially of 1.05 to 2.0. Polydispersity is understood to mean the quotient of weight-average molecular weight $M_W$ and number-average molecular weight $M_n$ (PDI=$M_w/M_n$).

In the context of the present invention, polyisobutenes that preferably serve as the basis for the inventive compounds of the formula (I) are also understood to mean all polymers obtainable by cationic polymerization that comprise, in polymerized form, preferably at least 60% by weight of isobutene, more preferably at least 80% by weight, in particular at least 90% by weight and especially at least 95% by weight of isobutene. In addition, the polyisobutenes may comprise, in copolymerized form, further butene isomers such as 1- or 2-butene and different olefinically unsaturated monomers copolymerizable with isobutene under cationic polymerization conditions.

Suitable isobutene feedstocks for the preparation of polyisobutenes that can serve as a basis for the inventive compounds of the formula (I) are accordingly both isobutene itself and isobutenic C$_4$ hydrocarbon streams, for example C$_4$ raffinates, C$_4$ cuts from isobutene dehydrogenation, C$_4$ cuts from steamcrackers, FCC crackers (FCC: fluid catalytic cracking), provided that they have been largely freed of 1,3-butadiene present therein. Particularly suitable C$_4$ hydrocarbon streams generally comprise less than 500 ppm, preferably less than 200 ppm, of butadiene. When C$_4$ cuts are used as feed material, the hydrocarbons other than isobutene assume the role of an inert solvent.

Useful monomers copolymerizable with isobutene include vinylaromatics such as styrene and α-methylstyrene, C$_1$-C$_4$-alkylstyrenes such as 2-, 3- and 4-methylstyrene and 4-tert-butylstyrene, isoolefins having 5 to 10 carbon atoms, such as 2-methylbutene-1,2-methylpentene-1,2-methylhexene-1,2-ethylpentene-1,2-ethylhexene-1 and 2-propylheptene-1.

Typical polyisobutenes that as a basis for the inventive compounds of the formula (I) are, for example, the Glissopal® products from BASF SE, Ludwigshafen, e.g. Glissopal 1000, Glissopal 1300 and Glissopal 2300, and the Oppanol® products from BASF SE, e.g. Oppanol® B10, B12 and B15.

In the formula (I), the radicals are defined as follows:

$R^1$ to $R^5$ are each independently selected from the group consisting of hydrogen, C$_1$-C$_{20}$-alkyl, C$_1$-C$_{20}$-alkyloxy and C$_8$-C$_{3500}$-polyisobutyl and C$_8$-C$_{3500}$-polyisobutenyl.

Those of the $R^1$ to $R^5$ radicals that are a polyisobutyl or polyisobutenyl, preferably a polyisobutyl radical, have at least 8, preferably at least 12, more preferably at least 16, even more preferably at least 20 and especially at least 35 carbon atoms.

In a preferred embodiment, they have at least 50 and more preferably at least 60 carbon atoms.

In general, the polyisobutyl or polyisobutenyl radicals have up to 3500 carbon atoms, preferably up to 3200, more preferably up to 2200, even more preferably up to 1500 and especially up to 750.

In a preferred embodiment, they have up to 200, more preferably up to 100 and especially up to 80 carbon atoms.

This is subject to the proviso that at least one of the $R^1$ to $R^5$ radicals is one of the polyisobutyl or polyisobutenyl mentioned, preferably one, two or three, more preferably one or two and most preferably exactly one.

Those of the $R^1$ to $R^5$ radicals that are not one of the polyisobutyl or polyisobutenyl radicals mentioned are preferably selected from the group consisting of hydrogen, methyl, isopropyl, tert-butyl, methoxy, tert-butyloxy, more preferably selected from the group consisting of hydrogen, methyl, tert-butyl, and most preferably they are hydrogen.

In a preferred embodiment, at least one of the $R^1$, $R^3$ and $R^5$ radicals is a polyisobutyl or polyisobutenyl radical and the others are not; more preferably, $R^3$ is a polyisobutyl or polyisobutenyl radical and the others are not.

R is an alkylene group having 2 to 10, preferably 2 to 6 and more preferably 2 to 4 carbon atoms, preferably 1,2-ethylene, 1,2-propylene, 1,3-propylene, 1,2-butylene, 1,4-butylene, 1-phenyl-1,2-ethylene or 2-phenyl-1,2-ethylene, more preferably 1,2-ethylene, 1,2-propylene or 1,2-butylene and most preferably 1,2-ethylene.

n is a positive integer from 1 to 50, preferably from 1 to 30, more preferably from 1 to 20, even more preferably from 1 to 10, particularly from 1 to 5, and especially 1.

$R^6$ is hydrogen or methyl, preferably methyl.

$R^7$ is hydrogen, methyl or COOR$^8$, preferably hydrogen or COOR$^8$ and more preferably hydrogen.

$R^8$ is hydrogen or C$_1$-C$_{20}$-alkyl, preferably hydrogen, methyl, ethyl, n-butyl or 2-ethylhexyl, more preferably hydrogen or methyl and most preferably hydrogen.

It should be noted that the compounds of the formula (I) are reaction mixtures having a distribution of the product composition according to the reaction conditions. Thus, the chain length of the polyisobutyl or polyisobutenyl radicals is subject to a distribution around a statistical average, as are the substitution pattern of the polyisobutyl or polyisobutenyl radicals on the aromatic ring and possibly the length of the —[—R—O—]$_n$— chain, which may likewise be distributed around a statistical average n. Thus, while the value of n for each individual compound of the formula (I) assumes positive integer numbers, it can also assume non-integer values on statistical average for the reaction mixture.

In a preferred embodiment, the reaction mixture has an average functionality of α,β-unsaturated carbonyl functions, preferably of (meth)acrylate groups, of not more than 1.2, more preferably of not more than 1.1, most preferably of not more than 1.05.

The average functionality is generally at least 0.8, preferably at least 0.9 and most preferably at least 0.95.

The degree of functionalization can be determined by means of quantitative 1H NMR spectroscopy. This involves integrating the signals for the protons on the aromatic system which are typically easy to assign and to recognize and are not masked by other signals and the signals for the protons of the polymerizable double bond, and expressing them as a ratio.

The compounds (A) can be prepared, for example, by reacting the free phenols of the formula

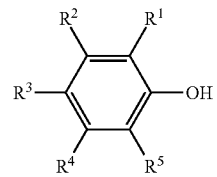

with alkylene oxides or alkylene carbonates of the formula

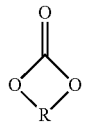

followed by a decarboxylation and subsequent esterification with (meth)acrylic acid, crotonic acid, fumaric acid, maleic acid or maleic anhydride, or transesterification with (meth)acrylic esters, crotonic esters, fumaric esters or maleic esters.

The preparation of the free phenols is known from the prior art cited at the outset, for example WO 02/059237 or WO 14/90672 and the literature cited therein.

While EP 2762506 A1, proceeding from chlorinated starter molecules, conducts a cationic polymerization and arrives at polyisobutene polymers bearing a chlorine atom at each chain end, it is a preferred embodiment of the present invention to bind a polyisobutene bearing a double bond to a phenol with a Lewis acid by Friedel-Crafts alkylation. Thus, the compounds according to EP 2762506 A1, as a result of the process, have a significantly higher halogen content than this embodiment of the reaction, which is preferred in accordance with the invention, of a polyisobutene bearing a double bond with phenol in the presence of a Lewis acid.

Preferably, by this route, reaction mixtures having a halogen content, preferably a fluorine content, of not more than 70 ppm by weight are obtained, more preferably not more than 50 ppm by weight, even more preferably not more than 40 ppm by weight, particularly not more than 30 ppm by weight and especially not more than 20 ppm by weight. It is even possible to obtain reaction mixtures having a halogen content, preferably a fluorine content, of not more than 10 ppm by weight or even not more than 5 ppm by weight.

The alkoxylated products are generally prepared by reacting the free phenols with the respective epoxide in the desired stoichiometry in the presence of a catalyst, for example an alkali metal or alkaline earth metal hydroxide, oxide, carbonate or hydrogencarbonate, preferably an alkali metal hydroxide, more preferably potassium hydroxide. Possible ways of conducting the reaction can be found in Houben-Weyl, Methoden der Organischen Chemie [Methods of Organic Chemistry], 4th edition, 1979, Thieme Verlag Stuttgart, ed.: Heinz Kropf, volume 6/1a, part 1, pages 373 to 385. A preferred embodiment can be found in WO 02/059237 A2, particularly from page 9 line 12 to page 10 line 21, which is hereby incorporated into the present disclosure by reference.

The alkoxylated products can also be prepared with the aid of multimetal cyanide compounds, frequently also referred to as DMC catalysts, which have long been known and have been described many times in the literature, for example in U.S. Pat. No. 3,278,457 and in U.S. Pat. No. 5,783,513.

The DMC catalysts are typically prepared by reacting a metal salt with a cyanometalate compound. For improvement of the properties of the DMC catalysts, it is customary to add organic ligands during and/or after the reaction. A description of the preparation of DMC catalysts can be found, for example, in U.S. Pat. No. 3,278,457.

Typical DMC catalysts have the following general formula:

$$M^1_a[M^2(CN)_b]_d \cdot fM^1_j X_k \cdot h(H_2O)eL \cdot zP$$

in which $M^1$ is a metal ion selected from the group comprising $Zn^{2+}$, $Fe^{2+}$, $Fe^{3+}$, $Co^{2+}$, $Co^{3+}$, $Ni^{2+}$, $Mn^{2+}$, $Sn^{2+}$, $Sn^{4+}$, $Pb^{2+}$, $Al^{3+}$, $Sr^{2+}$, $Cr^{3+}$, $Cd^{2+}$, $Cu^{2+}$, $La^{3+}$, $Ce^{3+}$, $Ce^{4+}$, $Eu^{3+}$, $Mg^{2+}$, $Ti^{4+}$, $Ag^+$, $Rh^{2+}$, $Ru^{2+}$, $Ru^{3+}$, $Pd^{2+}$.

$M^2$ is a metal ion selected from the group comprising $Fe^{2+}$, $Fe^{3+}$, $Co^{2+}$, $Co^{3+}$, $Mn^{2+}$, $Mn^{3+}$, $Ni^{2+}$, $Cr^{2+}$, $Cr^{3+}$, $Rh^{3+}$, $Ru^{2+}$, $Ir^{3+}$, and $M^1$ and $M^2$ are the same or different, X is an anion selected from the group comprising halide, hydroxide, sulfate, hydrogen sulfate, carbonate, hydrogen carbonate, cyanide, thiocyanate, isocyanate, cyanate, carboxylate, oxalate, nitrate or nitrite ($NO_2^-$) or a mixture of two or more of the aforementioned anions, or a mixture of one or more of the aforementioned anions with one of the uncharged species selected from CO, $H_2O$, and NO, Y is an anion other than X, is selected from the group comprising halide, sulfate, hydrogen sulfate, disulfate, sulfite, sulfonate (=$RSO_3$– with R=$C_1$-$C_{20}$-alkyl, $C_6$-$C_{12}$-aryl, $C_1$-$C_{20}$-alkylaryl), carbonate, hydrogen carbonate, cyanide, thiocyanate, isocyanate, isothiocyanate, cyanate, carboxylate, oxalate, nitrate, nitrite, phosphate, hydrogenphosphate, dihydrogenphosphate, diphosphate, borate, tetraborate, perchlorate, tetrafluoroborate, hexafluorophosphate, tetraphenylborate, L is a water-miscible ligand selected from the group comprising alcohols, aldehydes, ketones, ethers, polyethers, esters, polyesters, polycarbonate, ureas, amides, nitriles, and sulfides or mixtures thereof, P is an organic additive selected from the group comprising polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymer, hydroxyethylcellulose, polyacetates, ionic surface- and interface-active compounds, bile acid or salts, esters or amides thereof, carboxylic esters of polyhydric alcohols, and glycosides, and a, b, d, g, n, r, s, j, k and t are whole or fractional numbers greater than zero, e, f, h and z are whole or fractional numbers greater than or equal to zero, where a, b, d, g, n, j, k and r, and s and t, are selected so as to assure electronic neutrality, $M^3$ is hydrogen or an alkali metal or alkaline earth metal, and $M^4$ are alkali metal ions or an ammonium ion ($NH_4^+$ or alkylammonium ion ($R_4N^+$, $R_3NH^+$, $R_2NH_2^+$, $RNH_3^+$ where R=$C_1$-$C_{20}$-alkyl).

In a particularly preferred embodiment of the invention, $M^1$ is $Zn^{2+}$ and $M^2$ is $Co^{3+}$ or $Co^{2+}$.

The metals $M^1$ and $M^2$ are the same especially when they are cobalt, manganese or iron.

In a preferred embodiment, the alkoxylation takes place in such a way that the phenol bearing polyisobutene groups is reacted with an alkylene oxide, preferably selected from the group consisting of ethylene oxide, propylene oxide, butylene oxide, styrene oxide and mixtures thereof, in the presence of strong bases, preferably alkali metal and alkaline earth metal salts of $C_1$-$C_4$ alcohols, alkali metal hydroxide and alkaline earth metal hydroxides, Brønsted acids or Lewis acids, such as $AlCl_3$, $BF_3$ etc. Preference is given to alkali metal and alkaline earth metal salts of $C_1$-$C_4$ alcohols, alkali metal hydroxides and alkaline earth metal hydroxides, particular preference to sodium methoxide, potassium methoxide, potassium tert-butoxide, sodium hydroxide and potassium hydroxide, very particular preference to potassium tert-butoxide and potassium hydroxide. The use amount of the catalysts is generally within a range from about 0.01% to 1% by weight, especially 0.05% to 0.5% by weight, based on the total amount of the reactants.

The alkoxylation is preferably effected at temperatures in the range from about 70 to 200° C., preferably about 100 to 160° C. The pressure is preferably between ambient pressure and 150 bar, especially in the range from 3 to 30 bar. If desired, the alkylene oxide may comprise an admixture of inert gas, for example about 5% to 60%.

The reaction product can be worked out by standard methods known to those skilled in the art, for example by outgassing of volatile constituents under reduced pressure or by stripping with a gas which is inert under the conditions, and optionally by filtration.

The catalyst can also be removed by a treatment of the product with magnesium silicates (for example Ambosol®) and subsequent filtration.

The residues of the catalyst can remain in the product obtained or be neutralized with an acid, preferably hydrochloric acid, sulfuric acid, phosphoric acid or acetic acid, where the salts can then preferably be removed by a scrubbing operation, for example, or by ion exchanger. There may optionally be a partial neutralization, and the product may be used further without further removal of the salts.

The reaction with alkylene carbonates, preferably 1,2-ethylene carbonate, 1,3-propylene carbonate and 1,2-propylene carbonate, is generally effected in a stoichiometry of 1 to 2 mol of carbonate:1 mol of phenol, preferably 1.05-1.8:1, more preferably 1.1-1.7:1, most preferably 1.2-1.5:1 mol/mol.

Catalysts used for the reaction with alkylene carbonates may be inorganic salts, tertiary amines, triphenylphosphine, lithium hydride and organic stannates.

The inorganic salt preferably has at least one anion selected from the group consisting of carbonate ($CO_3^{2-}$), oxide ($O^{2-}$), hydroxide ($OH^-$), hydrogencarbonate ($HCO_3^-$), phosphate ($PO_4^{3-}$), hydrogenphosphate ($HPO_4^{2-}$) and dihydrogenphosphate ($H_2PO_4^-$). Preference is given to oxide, hydroxide and phosphate or mixtures thereof, particular preference being given to phosphate.

The inorganic salt preferably has at least one cation selected from the group consisting of alkali metals, alkaline earth metals, tetraalkylammonium, ammonium, cerium, iron, manganese, chromium, molybdenum, cobalt, nickel or zinc. Preference is given to alkali metals and alkaline earth metals and particular preference to lithium, sodium, potassium or calcium. Particularly preferred inorganic salts including hydrates thereof are LiOH, $Li_3PO_4$, $Na_3PO_4$, $K_3PO_4$, $Na_2CO_3$, $K_2CO_3$ and CaO, very particular preference being given to $K_3PO_4$.

Conceivable, albeit less preferred, are tetraalkylammonium halides, preferably tetra-$C_1$-$C_{20}$-alkylammonium halides and more preferably tetra-$C_1$-$C_4$-alkylammonium halides, among the halides preferably chlorides, bromides and iodide, more preferably chlorides or bromides, and most preferably chlorides, and preferably tertiary amines, for example triethylamine and 2-methylimidazole, most preferably 2-methylimidazole.

It may be advantageous to leave the catalyst in the reaction mixture after the reaction has ended and to use it in the subsequent reaction; see below.

However, it is also possible to remove the catalyst from the reaction mixture, for example by an aqueous extraction of the reaction mixture or by a filtration.

The wash can be conducted, for example, in a stirred vessel or in another conventional apparatus, for example in a column or mixer-settler apparatus.

In chemical engineering terms, for a wash in the process of the invention, it is possible to use any extraction and washing methods and apparatuses known per se, for example those described in Ullmann's Encyclopedia of Industrial Chemistry, 6th ed., 1999 Electronic Release, chapter "Liquid-Liquid Extraction-Apparatus". For example, these may be single-stage or multistage, preferably single-stage, extractions and also extractions in cocurrent or countercurrent mode.

Separation from the heterogeneous catalyst is generally effected by filtration, electrofiltration, absorption, centrifugation or decantation, preferably by filtration. The heterogeneous catalyst separated off can then be used for further reactions.

The filtration can be conducted, for example, with a pressure suction filter. In chemical engineering terms, for a filtration in the process of the invention, it is possible to use any filtration methods and apparatuses known per se, for example those described in Ullmann's Encyclopedia of Industrial Chemistry, 7th ed., 2013 Electronic Release, chapter: Filtration, 1. Fundamentals and Filtration 2. Equipment. For example, these may be cartridge filters, filter presses, pressure plate filters, bag filters or drum filters. Preference is given to using cartridge filters or pressure plate filters.

The filtration can be conducted with or without filtering aids. Suitable filtering aids are filtering aids based on kieselguhr, perlite and cellulose.

Suitable centrifuges and also separators are known to the expert. In chemical engineering terms, for a centrifugation in the process of the invention, it is possible to use any centrifugation methods and apparatuses known per se, for example those described in Ullmann's Encyclopedia of Industrial Chemistry, 7th ed., 2013 Electronic Release, chapter: Centrifuges, Filtering and Centrifuges, Sedimenting.

The reaction is generally effected at a temperature of 70 to 200° C., particularly at 100 to 190° C. and most preferably 150 to 170° C.

It is likewise possible to increase the reaction temperature over the course of the reaction in order to accelerate the decarboxylation after ring-opening of the carbonate.

The reaction has generally ended within 24 hours, preferably within 1 to 20 hours, more preferably within 2 to 16 hours, most preferably 3 to 12 hours.

The reaction can be conducted without solvent or in the presence of a solvent, for example ethers, ketones or hydrocarbons, preferably without solvent.

Among the hydrocarbons, preference is given to the aromatic solvents having a boiling range at the particular pressure above the reaction temperature. Examples of these are those that comprise predominantly aromatic $C_7$ to $C_{14}$ hydrocarbons and may encompass a boiling range from 110° C. to 300° C., particular preference being given to toluene, o-, m- or p-xylene, trimethylbenzene isomers, tetramethylbenzene isomers, ethylbenzene, cumene, tetrahydronaphthalene and mixtures comprising these compounds.

Further examples are the Solvesso® products from ExxonMobil Chemical, particularly Solvesso® 100 (CAS No. 64742-95-6, predominantly $C_9$ and $C_{10}$ aromatics, boiling range about 154-178° C.), 150 (boiling range about 182-207° C.) and 200 (CAS No. 64742-94-5), and the Shellsol® products from Shell, Caromax® (e.g. Caromax® 18) from Petrochem Carless and Hydrosol from DHC (e.g. as Hydrosol® A 170). Hydrocarbon mixtures composed of paraffins, cycloparaffins and aromatics are also commercially available under the Kristalloel (for example Kristalloel 30, boiling range about 158-198° C. or Kristalloel 60: CAS No. 64742-82-1), white spirit (for example likewise CAS No. 64742-82-1) or Solvent naphtha (light: boiling range about 155-180° C., heavy: boiling range about 225-300° C.) trade names. The aromatics content of such hydrocarbon mixtures is generally more than 90% by weight, preferably more than 95, more preferably more than 98 and most preferably more than 99% by weight. It may be advisable to use hydrocarbon mixtures having a particularly reduced content of naphthalene.

It is a preferred embodiment of the present invention to react the free phenol first with a carbonate, preferably ethylene carbonate, and then to react the reaction product thus obtainable, bearing a —R—O—H group, with an alkylene oxide or alkylene oxide mixture until the desired number n in the structural unit —[—R—O—]$_n$— has been attained.

This has the advantage that a narrower molecular weight distribution is obtained.

A further advantage is that products in which, in the structural unit —[—R—O—]$_n$—, the first structural unit —[—R—O—]— differs from the second to nth structural unit —[—R—O]— are obtainable.

The esterification with (meth)acrylic acid, crotonic acid, fumaric acid, maleic acid or maleic anhydride or transesterification with (meth)acrylic esters, crotonic esters, fumaric esters or maleic esters of the alkoxylated phenol of the formula

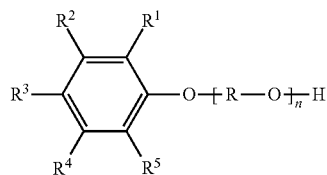

is generally effected as follows:

For this purpose, the alkoxylated phenol and (meth)acrylic acid, crotonic acid, fumaric acid, maleic acid or maleic anhydride are reacted in a molar ratio of acid to phenol of generally at least 1:1, preferably at least 1.05:1, more preferably at least 1.1:1, even more preferably at least 1.25:1 and especially at least 1.5:1. In general, a molar ratio of not more than 5:1 is required, preferably not more than 4:1, more preferably not more than 3:1 and most preferably not more than 2:1.

Usable esterification catalysts are sulfuric acid, aryl- or alkylsulfonic acids or mixtures thereof. Examples of arylsulfonic acids are benzenesulfonic acid, para-toluenesulfonic acid or dodecylbenzenesulfonic acid; examples of alkylsulfonic acids are methanesulfonic acid, ethanesulfonic acid or trifluoromethanesulfonic acid. Strongly acidic ion exchangers or zeolites are also usable as esterification catalysts. Preference is given to sulfuric acid and sulfonic acids, particular preference to methanesulfonic acid and para-toluenesulfonic acid.

These are used generally in an amount of 0.1-5% by weight, based on the esterification mixture, preferably 0.5-5%, more preferably 1-4% and most preferably 2-4% by weight.

If required, the esterification catalyst can be removed from the reaction mixture with the aid of an ion exchanger. The ion exchanger can be added directly to the reaction mixture and then filtered off, or the reaction mixture can be passed through an ion exchanger bed.

Preference is given to leaving the esterification catalyst in the reaction mixture. If, however, the catalyst is an ion exchanger, it is preferably removed, for example by filtration.

Preferably, a polymerization inhibitor known per se is added to the (trans)esterification in a total amount of 0.01-5% by weight, based on the esterification mixture, preferably 0.02-3%, more preferably 0.05-2% by weight, even more preferably 0.1% to 1% and especially 0.3% to 1% by weight.

Examples of such polymerization inhibitors are adduced, for example, in WO 2005/082828 A1, particularly from page 15 line 27 to page 19 line 18, which is hereby incorporated into the present disclosure by reference.

For efficacy of the polymerization inhibitors, it may be advantageous to pass an oxygenous gas, for example air or lean air, over or preferably through the reaction mixture.

The water of reaction formed in the reaction can be distilled off during or after the esterification, and this operation can be assisted by a solvent that forms an azeotrope with water.

Suitable solvents for azeotropic removal of the water of reaction, if desired, are in particular aliphatic, cycloaliphatic and aromatic hydrocarbons or mixtures thereof.

Preference is given to using n-pentane, n-hexane, n-heptane, cyclohexane, methylcyclohexane, benzene, toluene or xylene. Particular preference is given to cyclohexane, methylcyclohexane and toluene.

Preference is given to performance of the esterification in the presence of a solvent.

The amount of solvent used is 10-200% by weight, preferably 20-100% by weight, more preferably 30% to 100% by weight, based on the sum total of phenol and acid.

If the water present in the reaction mixture is not removed by means of an azeotrope-forming solvent, it is possible to remove it via stripping with an inert gas, preferably an oxygenous gas, more preferably with air or lean air.

The reaction temperature for the esterification is generally 40-160° C., preferably 60-140° C. and more preferably 80-120° C. The temperature can remain the same or rise over the course of the reaction; it is preferably raised over the course of the reaction. In this case, the end temperature of the esterification is 5-30° C. higher than the starting temperature.

If a solvent is used, it can be distilled out of the reaction mixture after the reaction has ended.

The reaction mixture is optionally treated in a wash apparatus with water or a 5-30% by weight, preferably 5-20%, more preferably 5-15% by weight, sodium chloride, potassium chloride, ammonium chloride, sodium sulfate or aluminum sulfate solution, preferably sodium chloride solution.

The reaction mixture:wash liquid ratio is generally 1:0.1-1, preferably 1:0.2-0.8, more preferably 1:0.3-0.7.

The wash can be carried out, for example, in a stirred vessel or in another conventional apparatus, for example in a column or mixer-settler apparatus.

In chemical engineering terms, for a wash in the process of the invention, it is possible to use any extraction and washing methods and apparatuses known per se, for example those described in Ullmann's Encyclopedia of Industrial Chemistry, 6th ed., 1999 Electronic Release, chapter "Liquid-Liquid Extraction-Apparatus". For example, they may be single-stage or multistage, preferably single-stage, extractions, and also those in cocurrent or countercurrent mode.

The preliminary wash is preferably used when (some of) the inhibitors used are metal salts, preferably copper or copper salts.

The organic phase in the preliminary wash, which still comprises small amounts of catalyst and the majority of excess (meth)acrylic acid, is neutralized with a 5-25%, preferably 5-20%, more preferably 5-15%, by weight aqueous solution of a base, for example sodium hydroxide solution, potassium hydroxide solution, sodium hydrogencarbonate, sodium carbonate, potassium hydrogencarbonate, calcium hydroxide, aqueous ammonia or potassium carbonate, to which 5-15% by weight of sodium chloride, potassium chloride, ammonium chloride or ammonium sulfate may be added, preferably with sodium hydroxide solution or sodium hydroxide/sodium chloride solution.

The base is added in such a way that the temperature in the apparatus does not rise above 35° C., and is preferably between 20 and 35° C., and the pH is 10-14. The heat of neutralization is removed, if appropriate, by cooling the vessel with the aid of internal cooling coils or by means of jacket cooling.

The reaction mixture:neutralization liquid ratio is generally 1:0.1-1, preferably 1:0.2-0.8, more preferably 1:0.3-0.7.

With regard to the apparatus, the same applies as was stated above.

Optionally, for removal of traces of base or salt from the neutralized reaction mixture, a subsequent wash may be advantageous, which can be carried out analogously to the preliminary wash.

Alternatively, the reaction mixture can be worked up by addition of a 20-50% by weight aqueous sodium hydroxide solution, preferably 25-35%, more preferably 30%, and subsequent addition of a mineral that absorbs water and filtration, by means of which it is possible to remove the excess of acid and the catalyst. It is possible to use, for example, montmorillonite-comprising sheet silicates such as bentonite or aluminosilicates (Ambosol®).

In a further embodiment, the esterification can be effected by reacting the alcohol with (meth)acrylic anhydride, preferably in the presence of at least one basic catalyst.

Preference is given to those catalysts that have a $pK_B$ of not more than 11.0, preferably of not more than 7.0 and more preferably of not more than 3.0.

All bases are suitable in principle, such as alkali metal and alkaline earth metal hydroxides, and inorganic salts. Alkali metal and alkaline earth metal hydroxides may be used either in solid form or dissolved in solvents, for example as aqueous solutions.

The inorganic salt preferably has at least one anion selected from the group consisting of carbonate ($CO_3^{2-}$), oxide ($O^{2-}$), hydroxide ($OH^-$), hydrogencarbonate ($HCO_3^-$), phosphate ($PO_4^{3-}$), hydrogenphosphate ($HPO_4^{2-}$) and dihydrogenphosphate ($H_2PO_4^-$). Preference is given to oxide, hydroxide and phosphate or mixtures thereof, particular preference being given to phosphate. The inorganic salt preferably has at least one cation selected from the group consisting of alkali metals, alkaline earth metals, tetraalkylammonium, ammonium, cerium, iron, manganese, chromium, molybdenum, cobalt, nickel or zinc. Preference is given to alkali metals and alkaline earth metals and particular preference to lithium, sodium, potassium or calcium. Particularly preferred inorganic salts including hydrates thereof are LiON, NaOH, KOH, $Li_3PO_4$, $Na_3PO_4$, $K_3PO_4$, $Li_2CO_3$, $Na_2CO_3$, $K_2CO_3$ and CaO, very particular preference being given to NaOH, $K_2CO_3$ and $K_3PO_4$.

In an alternative embodiment, the compound of the formula (I) can also be prepared by a transesterification rather than an esterification. For this purpose, rather than a free acid, preference is given to using a $C_1$-$C_4$-alkyl ester of the acid, i.e. a methyl, ethyl, n-propyl, isopropyl, n-butyl, sec-butyl, isobutyl or tert-butyl ester, preferably a methyl, ethyl or n-butyl ester, more preferably a methyl or ethyl ester and most preferably a methyl ester.

Catalysts used for the preparation of (meth)acrylic esters by transesterification may, for example, be titanium alkoxides wherein the alkyl groups are $C_1$-$C_4$-alkyl radicals, e.g. tetramethyl, tetraethyl, tetraisopropyl, tetrapropyl, tetraisobutyl and tetrabutyl titanate (see, for example, EP-B1 298 867, EP-A2 960 877). Further catalysts proposed include titanium phenoxides (DE-A 200 86 18), metal chelate compounds of, for example, hafnium, titanium, zirconium or calcium, alkali metal and magnesium alkoxides, organic tin compounds, for example dimethyltin oxide, dibutyltin oxide or diphenyltin oxide, or inorganic salts.

Further suitable tin-comprising catalysts are Sn(IV)-comprising compounds, for example dialkyltin dichloride, dialkyltin oxide, dialkyltin diacetate, bis(trialkyltin) oxide, bis(dibutylchlorotin) oxide, for example dibutyltin dichloride, dimethyltin dichloride and dibutyltin oxide. The chloride-containing catalysts may be used together with alkoxides, for example with sodium methoxide.

The inorganic salt preferably has at least one anion selected from the group consisting of carbonate ($CO_3^{2-}$), oxide ($O^{2-}$), hydroxide ($OH^-$), hydrogencarbonate ($HCO_3^-$), phosphate ($PO_4^{3-}$), hydrogenphosphate ($HPO_4^{2-}$) and dihydrogenphosphate ($H_2PO_4^-$). Preference is given to oxide, hydroxide and phosphate or mixtures thereof, particular preference being given to phosphate. The inorganic salt preferably has at least one cation selected from the group consisting of alkali metals, alkaline earth metals, tetraalkylammonium, ammonium, cerium, iron, manganese, chromium, molybdenum, cobalt, nickel or zinc. Preference is given to alkali metals and alkaline earth metals and particular preference to lithium, sodium, potassium or calcium. Particularly preferred inorganic salts including hydrates thereof are LiOH, $Li_3PO_4$, $Na_3PO_4$, $K_3PO_4$, $Na_2CO_3$, $K_2CO_3$ and CaO, very particular preference being given to $K_3PO_4$.

Particularly suitable are heterogeneous catalysts or homogeneous catalysts which can be converted into heterogeneous residues, as in the transesterification methods described, for example, in DE 2 317 226 A1, DE 10 2004 036 930 A1 and WO2009/080380. The catalysts or residues of the catalysts are generally removed by filtration, electrofiltration, absorption, centrifugation or decantation.

For preparation of the compounds of the formula (I), it is possible to use any of the transesterification catalysts described in the prior art, preferably inorganic salts including hydrates thereof: LiOH, $Li_3PO_4$, $Na_3PO_4$, $K_3PO_4$, $Na_2CO_3$, $K_2CO_3$ and CaO.

The transesterification reaction is generally carried out at a temperature of from 60° C. to 140° C., preferably from 70°

C. to 110° C. In the course of this, an azeotrope of entraining agent and alcohol is distilled off continuously.

Suitable entraining agents that form an azeotropically boiling mixture with $C_1$-$C_4$ alcohols are firstly the corresponding $C_1$-$C_4$-alkyl esters themselves. Suitable separate azeotroping agents include cyclohexane, methylcyclohexane, benzene, toluene, hexanes and heptanes, and mixtures thereof. Preference is given to methyl acrylate, methyl methacrylate, ethyl acrylate and ethyl methacrylate, and to mixtures of these with n-heptane and cyclohexane. The term entraining agent in this context encompasses the reactant itself and any separate solvent additionally used.

In a preferred embodiment, no separate solvent is used as entraining agent. In this case, the alkyl (meth)acrylate reactant itself serves as entraining agent.

The entraining agent may subsequently be replenished in the reactor. For this purpose, the azeotropic mixture of alcohol and entraining agent, in a preferred embodiment, is distilled off by means of a suitable column, stirred with water in a mixing vessel and then transferred into a phase separator, wherein the alcohol, generally methanol or ethanol, dissolves in water and the organic phase separates out as the upper layer. The organic phase is preferably returned to the reaction mixture via the top of the column and hence recirculated save for small losses. It is alternatively also possible to add fresh entraining agent and work up the entraining agent/alcohol mixture in a separate step or to wholly or partly dispense with replenishment of the entraining agent.

In general, alkyl (meth)acrylate is used in a stoichiometric excess. The excess of methyl (meth)acrylate per hydroxyl group to be esterified is preferably from 0.1 to 100 equivalents, more preferably 3 to 50 equivalents, especially 10 to 40 equivalents.

The catalyst is used in a concentration of 2-20 mol % based on the amount of alcohol, preferably in a concentration of 3 to 10 mol %.

The transesterification can be conducted at atmospheric pressure, but also under elevated pressure or reduced pressure. In general, it is conducted at 300 to 1000 mbar, preferably at 800-1000 mbar (atmospheric pressure=1000 mbar). The reaction time is generally 1 to 24 hours, preferably 3 to 18 hours and more preferably 6 to 12 h. The transesterification can be effected continuously, for example in a stirred tank cascade, or batchwise.

The reaction may be conducted in all reactors suitable for a reaction of this type. Such reactors are known to those skilled in the art. The reaction is preferably effected in a stirred tank reactor.

The mixture can be mixed by any desired methods, for example stirrer apparatuses. The mixing can also be effected by feeding in a gas, preferably an oxygen-containing gas.

The alcohol formed, generally methanol or ethanol, is removed continuously or stepwise in a manner known per se by azeotropic distillation in the presence of an azeotroping agent. In addition, methanol may also be removed by stripping with a gas.

In a preferred embodiment, the alcohol is separated from the azeotrope of azeotroping agent and alcohol distilled off by washing with water and the azeotroping agent is recycled into the reaction vessel.

After the reaction has ended, the catalyst can be removed from the product by the already described separation processes of extraction or filtration, and the entraining agent can be distilled off.

It is a preferred embodiment of the present invention not to conduct any workup step, for example extraction or filtration, between the reaction of the free phenol with carbonate and/or alkylene oxide and the (trans)esterification.

It is a further preferred embodiment of the present invention to use the same catalyst for the reaction of the free phenol with carbonate and/or alkylene oxide and the (trans) esterification, more preferably for the reaction of the free phenol with carbonate and subsequent transesterification or reaction with (meth)acrylic anhydride.

This is advantageous especially when the catalysts used in the reaction of the free phenol with carbonate and/or alkylene oxide and catalysts for the (trans)esterification interact adversely with one another, for example acids and bases.

It is advantageous to conduct the reaction of the free phenol with the carbonate under catalysis by a tetraalkylammonium halide, EDTA or a tertiary amine, for example triethylamine, 2-methylimidazole, and to conduct the transesterification as already described in detail above.

It is likewise advantageous to conduct the reaction of the free phenol with the carbonate under catalysis by a tetraalkylammonium halide or EDTA and to conduct the esterification in the presence of an acid as already described in detail above.

It is likewise advantageous to conduct the reaction of the free phenol with the carbonate under catalysis by a tetraalkylammonium halide, EDTA or a tertiary amine, for example triethylamine, 2-methylimidazole, and to conduct the esterification with (meth)acrylic anhydride as already described in detail above.

It is particularly advantageous to conduct both the reaction of the free phenol with the carbonate and the (trans) esterification with (meth)acrylic anhydride under catalysis by an inorganic salt as already described in detail above.

A particular advantage here is also the simple removal of the catalyst by a filtration after performance of the two reaction steps.

It is likewise advantageous to conduct both the reaction of the free phenol with the carbonate and the transesterification under catalysis by the following catalysts:

alkali metal halides, hydroxides, oxides, carbonates, hydrogencarbonates or phosphates, alkaline earth metal halides, hydroxides, oxides, carbonates, hydrogencarbonates or phosphates, tetraalkylammonium halides, hydroxides, oxides, carbonates, hydrogencarbonates or phosphates.

One advantage of this process regime is that it is possible in this case to dispense with the separation of the catalyst from the alkoxylated phenol; instead, this can be postponed to the stage of the compound of the formula (I).

The present invention further provides polymers comprising at least one compound (A) in polymerized form.

In a preferred embodiment, these polymers may be homopolymers comprising exclusively compounds of the formula (I) in polymerized form, or, in another, likewise preferred embodiment, copolymers which comprise not only at least one compound of the formula (I) but also at least one other monomer (B), selected from the group consisting of (B1) (meth)acrylates other than (A)
(B2) fumaric acid derivatives and maleic acid derivatives
(B3) alkyl vinyl ethers
(B4) styrene and α-methylstyrene
(B5) acrylonitrile
(B6) vinyl alkanoates and
(B7) (meth)acrylamides.

The monomers (B1) are acrylic acid, methacrylic acid and (meth)acrylates other than (A), preferably acrylic acid, methacrylic acid, cycloalkyl (meth)acrylates, alkyl (meth) acrylates and (meth)acrylates of polyalkylene glycol monoethers.

Preferred cycloalkyl (meth)acrylates are cycloalkyl (meth)acrylates wherein the cycloalkyl radical is formed from a three- to twelve-membered ring, preferably a five- to twelve-membered ring and more preferably a five- or six-membered ring.

Preference is given in particular to cyclopentyl (meth) acrylate, cyclohexyl (meth)acrylate, cyclooctyl (meth)acrylate and cyclododecyl (meth)acrylate, particular preference to cyclopentyl (meth)acrylate, cyclohexyl (meth)acrylate and cyclododecyl (meth)acrylate, very particular preference to cyclopentyl (meth)acrylate and cyclohexyl (meth)acrylate, and especially cyclohexyl (meth)acrylate, preference being given to the acrylates in each case over the methacrylates.

Examples of alkyl (meth)acrylates are alkyl (meth)acrylates wherein the alkyl radical comprises one to 20 carbon atoms, preferably one to 12 and more preferably one to 8.

Preference is given in particular to methyl (meth)acrylate, ethyl (meth)acrylate, isopropyl (meth)acrylate, n-propyl (meth)acrylate, n-butyl (meth)acrylate, isobutyl (meth)acrylate, sec-butyl (meth)acrylate, tert-butyl (meth)acrylate, n-hexyl (meth)acrylate, n-heptyl (meth)acrylate, n-octyl (meth)acrylate, n-decyl (meth)acrylate, n-dodecyl (meth) acrylate, n-tetradecyl (meth)acrylate, n-hexadecyl (meth) acrylate, n-heptadecyl (meth)acrylate), n-octadecyl (meth) acrylate, n-eicosyl (meth)acrylate, 2-ethylhexyl (meth) acrylate and 2-propylheptyl (meth)acrylate, particular preference to methyl (meth)acrylate, ethyl (meth)acrylate, n-butyl (meth)acrylate, tert-butyl (meth)acrylate and 2-ethylhexyl (meth)acrylate, very particular preference to methyl acrylate, methyl methacrylate, ethyl acrylate, n-butyl acrylate, tert-butyl acrylate and 2-ethylhexyl acrylate and very particular preference to n-butyl acrylate and 2-ethylhexyl acrylate.

Examples of (meth)acrylates of oligo- and polyalkylene glycol monoethers are (meth)acrylates of oligo- and polyethylene glycol monoalkyl ethers, preferably the phenyl ethers, ethyl ethers or n-butyl ethers, more preferably the methyl ethers or n-butyl ethers, and most preferably the methyl ethers.

Fumaric acid derivatives and maleic acid derivatives (B2) include fumaric acid and maleic acid and the $C_1$- to $C_4$-alkyl esters, and also, in the case of maleic acid, maleic anhydride. Preference is given to fumaric acid and maleic acid, methyl fumarate and maleate, ethyl fumarate and maleate, n-butyl fumarate and maleate and 2-ethylhexyl fumarate and maleate, and also maleic anhydride, particular preference being given to maleic anhydride.

The alkyl vinyl ethers (B3) may preferably be alkyl vinyl ethers, preferably $C_1$-$C_8$-alkyl vinyl ethers, more preferably selected from the group consisting of methyl vinyl ether, ethyl vinyl ether, n-propyl vinyl ether, iso-propyl vinyl ether, n-butyl vinyl ether, sec-butyl vinyl ether, iso-butyl vinyl ether, tert-butyl vinyl ether, hexyl vinyl ether and octyl vinyl ether, and mixtures thereof.

Monomers (B4) include styrene and α-methylstyrene, preferably styrene.

Monomer (B5) is acrylonitrile.

The vinyl alkanoates (B6) are preferably vinyl esters of carboxylic acids having 2 to 13 carbon atoms, preferably selected from the group consisting of vinyl acetate, vinyl propionate, vinyl butyrate, vinyl 2-ethylhexanoate, vinyl neopentanoate, vinyl hexanoate, vinyl neononanoate and vinyl neodecanoate, more preferably selected from the group consisting of vinyl acetate, vinyl propionate, vinyl butyrate and vinyl neopentanoate, most preferably vinyl acetate.

Monomer (B7) is preferably methacrylamide and acrylamide, more preferably acrylamide.

Preference is given here to monomers (B1), (B3), (B4) and (B7), particular preference to (B1) and (B3), and very particular preference to (B1).

It may be sufficient when the proportion of monomer (A) in the polymer in polymerized form is at least 1% by weight, preferably at least 2% by weight, more preferably at least 5% by weight and most preferably at least 8% by weight.

The proportion of monomer (A) in the polymer in polymerized form should preferably be at least 10% by weight, preferably at least 20% by weight, more preferably at least 30% by weight and most preferably at least 50% by weight.

The proportion of monomer (A) in the polymer in polymerized form may be up to 100% by weight (homopolymer), preferably up to 95% by weight, more preferably up to 90%, even more preferably up to 85% and especially up to 70% by weight.

In the case of copolymers, one or more than one other monomer except for (A) may be used, preferably one, two or three, more preferably one or two and most preferably exactly one.

The monomer components (A) and optionally (B) can preferably be polymerized in neat form, in suspension or in solution, more preferably in solution or suspension, most preferably in emulsion. For this purpose, the polymerization reaction is generally conducted at standard pressure and under a protective gas such as nitrogen, but it is also possible to work at elevated pressures, for example in an autoclave. The polymerization temperatures are generally 50 to 250° C., especially 90 to 210° C., in particular 120 to 180° C., typically 140 to 160° C. Suitable polymerization reactors are in principle all customary continuous or batchwise apparatuses, for example stirred tanks, stirred tank cascades, tubular reactors or loop reactors.

In the case of emulsion polymerization, the polymerization is preferably done without application of external pressure at temperatures of 50 to 95° C.

Typically, the polymerization is initiated by initiators that break down to give free radicals; suitable for this purpose are air or oxygen or inorganic or organic peroxides and/or hydroperoxides, and organic azo compounds. Examples of useful organic peroxides or hydroperoxides include diisopropylbenzene hydroperoxide, tert-butyl hydroperoxide, cumene hydroperoxide, methyl isobutyl ketone peroxide, di-tert-butyl peroxide and tert-butyl perisononoate. An example of a suitable organic azo compound is azobisisobutyronitrile ("AIBN"). In addition, as well as hydrogen peroxide, peroxodisulfates should also be mentioned, particularly sodium peroxodisulfate.

Also conceivable are redox pairs of the above peroxides or hydroperoxides with disulfites, the adduct of a disulfite and acetone, preferably acetone bisulfite, or Rongalit® C.

In addition, suitable chain transfer agents such as aliphatic aldehydes or ketones or else hydrogen may also be used in the polymerization.

If solvents or suspension media are also used in the polymerization, the customary inert liquids are suitable for this purpose, such as aromatic hydrocarbons, e.g. toluene, xylenes or corresponding technical grade hydrocarbon mixtures such as Solvesso® or Solvent Naphtha, and aliphatic and cycloaliphatic hydrocarbons and hydrocarbon mixtures, for example pentane, hexanes, heptanes, petroleum ether, ligroin, cyclohexane, methylcyclohexane and decalin.

In a preferred embodiment, the polymerization is conducted by means of emulsion polymerization, more preferably by means of miniemulsion polymerization.

In a preferred embodiment, the is executed by means of miniemulsion polymerization as in WO 2016/046195 A1, particularly from page 15 line 31 to page 27 line 32, which is hereby incorporated into the present disclosure by reference.

In these processes, in general, in a first step, the monomers, the necessary amount of emulsifiers and/or protective colloid, any hydrophobic addition and water are used to produce a mixture, and this is used to generate an emulsion. The hydrophobic monomers are pre-emulsified here by the auxiliaries.

Preferably, in a first step, the organic phase is produced in homogeneous form and, in a second step, this organic phase is added to a water phase or a water phase is added to the organic phase thus produced.

Subsequently, an oil-in-water macroemulsion is prepared by stirring. The particles of the macroemulsion are reduced to a size of less than 1 μm by ultrasound and/or high-pressure homogenization.

Preferably, in the emulsion was produced, the average particle size (z average), measured by means of dynamic light scattering, is generally <1000 nm, preferably <500 nm and more preferably 20-500 nm. Normally, the diameter is 50-400 nm.

The particles obtained decide in size by comparison with conventional emulsion polymerization. Whereas the droplet size in conventional emulsion polymerization is greater than 1.5 μm, particularly 2 to 50 μm, the droplet size in the preparation of a miniemulsion is less than 1000 nm.

The monomers emulsified in droplet form are then polymerized by means of an initiator.

According to the invention, production of the emulsion requires an energy input of not more than $10^8$ W/m$^3$.

It is appropriate to conduct the production of the emulsion sufficiently rapidly that the emulsification time is small compared to the reaction time of the monomers with one another.

In a preferred configuration of the process, the entirety of the emulsion is produced with cooling to temperatures below room temperature. Preference is given to accomplishing the production of emulsion within less than 10 min. Increasing the temperature of the emulsion while stirring completes the conversion. The reaction temperatures are between room temperature and 120° C., preferably between 60° C. and 100° C. If required, pressure can be applied in order to keep low-boiling components in liquid form.

Generally, in the production of emulsions, ionic and/or nonionic emulsifiers and/or protective colloids or stabilizers are used as interface-active compounds.

A detailed description of suitable protective colloids can be found in Houben-Weyl, Methoden der organischen Chemie, volume XIV/1, Makromolekulare Stoffe [Macromolecular Materials], Georg Thieme Verlag, Stuttgart, 1961, p. 411 to 420. Useful emulsifiers include anionic, cationic and nonionic emulsifiers. Preference is given to using, as accompanying interface-active substances, exclusively emulsifiers having molecular weights, by contrast with the protective colloids, of typically below 2000 g/mol. When mixtures of interface-active substances are used, the individual components must, of course, be compatible with one another, and in case of doubt this can be checked by a few preliminary tests. Preference is given to using anionic and nonionic emulsifiers as interface-active substances. Commonly used accompanying emulsifiers are, for example, ethoxylated fatty alcohols (EO: 3 to 50, alkyl radical: $C_8$ to $C_{36}$), ethoxylated mono-, di- and trialkylphenols (EO: 3 to 50, alkyl radical: $C_4$ to $C_9$), alkali metal salts of dialkyl esters of sulfosuccinic acid and alkali metal and/or ammonium salts of alkyl sulfates (alkyl radical: $C_8$ to $C_{12}$), of ethoxylated alkanols (EO: 4 to 30, $C_9$), of alkylsulfonic acids (alkyl radical: $C_{12}$ to $C_{18}$) and of alkarylsulfonic acids (alkyl radical: $C_9$ to $C_{18}$).

Suitable emulsifiers can also be found in Houben-Weyl, Methoden der organischen Chemie, volume 14/1, Makromolekulare Stoffe, Georg Thieme Verlag, Stuttgart, 1961, p. 192 to 208.

Trade names of emulsifiers are, for example, Dowfax® 2 A1 from Dow, Emulan® NP 50, Emulan® OG, Disponil® FES 27, Disponil® FES 32, Disponil® FES 77, Lutensol® AT 11, Disponil® SDS, Lutensol® AT 18, Lutensol® TO 2, Lutensol® TO 3, Lutensol® TO 5, Lutensol® TO 8, Lutensol TO® 10, Nekanil® 904 S from BASF, Lumiten® 1-RA and Lumiten E 3065 from BASF, Dextrol® OC 50 from AVEBE GmbH, etc.

Based on the amount of monomers present in the aqueous emulsion, this amount of emulsifier is generally in the range from 0.1% to 10% by weight. As already mentioned, protective colloids capable of stabilizing the disperse distribution of the ultimately resulting aqueous polymer dispersions may be added alongside the emulsifiers. Irrespective of the amount of emulsifier used, the protective colloids may be used in amounts of up to 50% by weight, for example in amounts of 1% to 30% by weight, based on the monomers.

Costabilizers that may be added to the monomers as hydrophobic additive may be substances that have a solubility in water of less than $5\times10^{-5}$ and preferably $5\times10^{-7}$ g/L, in amounts of 0.01% by weight to 10% by weight, preferably 0.1-1% by weight. Examples are hydrocarbons such as hexadecane, halogenated hydrocarbons, silanes, siloxanes, hydrophobic oils (olive oil), dyes etc. Instead of these, it is also possible for blocked polyisocyanates to assume the hydrophobic function.

In a preferred execution, a mixture is first prepared from the monomers, emulsifiers and/or protective colloids, and optionally hydrophobic addition and water. Then an emulsion is generated and this is heated while stirring. On attainment of the required reaction temperature, the initiator is added via the water phase.

It is of course alternatively possible to add the initiator to the oil phase of the emulsion, i.e. to the monomer phase, prior to dispersion, or to add it to the water phase immediately after the production of the emulsion. This is followed by heating and polymerization while stirring.

More preferably, the process for producing a dispersion by miniemulsion polymerization can be described as follows:

i. mixing the monomers and possibly adding a cosolvent
ii. producing a macroemulsion by the addition of the hydrophobic phase from step i. to a premixed water/emulsifier solution
iii. reducing the particles by ultrasound and/or high-pressure homogenization to particle sizes less than 1000 nm, preferably <500 nm and more preferably 20-500 nm
iv. initiating a free-radical polymerization of the oil-in-water miniemulsion from step iii.

The mass-average molecular weight $M_w$ of the polymers thus obtainable is generally 5000 g/mol or more, preferably at least 10 000 g/mol, more preferably at least 20 000 g/mol, even more preferably at least 30 000 g/mol and particularly at least 50 000 g/mol, and especially at least 100 000 g/mol.

The upper limit in the mass-average molecular weight $M_w$ of the polymers thus obtainable is generally up to 1 000 000 g/mol, preferably up to 700 000 and more preferably up to 300 000 g/mol.

The polydispersity $M_w/M_n$ is generally not more than 5, preferably not more than 4, more preferably not more than 3, even more preferably not more than 2 and especially not more than 1.5.

It is a particular advantage of the miniemulsion polymerization that it is possible here to achieve higher molecular weights compared to solution or bulk polymerization for example.

The compounds (A) obtainable by the present invention and the polymers that comprise them in polymerized form find use in the production of adhesives, adhesive raw materials, fuel additives, lubricant additives, as elastomers or as base constituent of sealants and sealing compounds.

EXAMPLES

Analysis

Size exclusion chromatography was conducted in THF+ 0.1% trifluoroacetic acid at 35° C. and a flow rate of 1 mL/min with a column combination of, if appropriate, a PLgel precolumn and two PLgel MIXED-B columns (I.D. 7.5 mm, length 30 cm, exclusion limit 500-10 000 000 g/mol). Calibration was effected with narrow-distribution polystyrene standards.

Example A 1775 g of polyisobutene ($M_n$ 1000 g/mol) were dissolved in 360 g of hexane. 345 g of phenol were initially charged in 180 g of toluene in a 4 L HWS vessel with base outlet, and cooled to 16° C. by means of a cooling thermostat. 32.7 g of $BF_3$-phenol complex were added to the phenol solution. The polyisobutene solution was metered in at 16° C. within 5 h 30 min. The reaction was stirred at room temperature overnight and then terminated with 1 L of methanol. Workup and removal of excess phenol were effected by dilution with hexane and extraction with methanol. Conversion was determined by means of $^1$H NMR (400 MHz in $CDCl_3$).

$^1$H NMR (400 MHz in $CDCl_3$) δ (ppm)=7.22 (m, 2H), 6.75 (m, 2H), 4.57 (s, 1H), 1.79 (s, 2H), 1.65-0.90 ($CH_3$ and $CH_2$, PIB), 0.81 (s, 6H).

Example B 1380 g of polyisobutene ($M_n$ 2300 g/mol) were dissolved in 400 g of hexane. 113 g of phenol were initially charged under nitrogen in 200 g of toluene in a 4 L HWS vessel with base outlet, and cooled to 19° C. by means of a cooling thermostat. 15.4 g of $BF_3$-phenol complex were added dropwise to the phenol solution. The polyisobutene solution was metered in at 17-20° C. within 4 h. The reaction was stirred at room temperature for 48 h and then terminated with a methanol/hexane mixture (1 L/500 mL). Workup and removal of excess phenol were effected by extraction with methanol. Conversion was determined by means of $^1$H NMR (400 MHz in $CD_2Cl_2$).

Example 1

Transesterification was effected with introduction of lean air in a 4 L jacketed reactor equipped with an anchor stirrer, a lean air inlet, a separating column and a liquid divider. This apparatus was charged with 3383 g of a 30% solution of a monoethoxylated phenol bearing a polyisobutene radical according to example 9 in methyl methacrylate. 0.3 g of methylhydroquinone (MEHQ) and 14.9 g of potassium phosphate were added and the reaction mixture was heated up at a bath temperature of initially 110° C. with introduction of lean air (2 L/h). A pressure of 600 mbar (abs.) was established and an azeotrope of methanol and methyl methacrylate was distilled off continuously, in the course of which a liquid phase temperature at 84° C. to 87° C. was established. The reflux ratio was variable at 10:1 to 20:1 (reflux:efflux). After the reaction had ended, 15 g of Hyflo Super Cel® and 15 g of Ambosol® MP 25 were added to the product, which was filtered through a pressure filter at max. 2 bar, and the reaction mixture was concentrated under reduced pressure. 970 g of product were obtained. Conversion is determined as >99% via TAI NMR, The stabilizer content was 130 ppm MEHQ (determined by HPLC).

$^1$H NMR (400 MHz in $CD_2Cl_2$) δ (ppm)=7.28 (m, 2H), 6.83 (m, 2H), 6.11 (m, 1H), 5.58 (m, 1H), 4.46 (m, 2H), 4.20 (m, 2H), 1.94 (s, 3H), 1.82 (s, 2H), 1.65-0.90 ($CH_3$ and $CH_2$, PIB), 0.81 (s, 6H).

The fluorine content (determined by combustion IC) was <1 ppm.

Example 2 (Comparative)

Transesterification was effected with introduction of air in a 0.75 L jacketed reactor equipped with an anchor stirrer, an air inlet, a separating column and a liquid divider. This apparatus was initially charged with 50 g of a phenol bearing a polyisobutene radical, obtained analogously to example A, and 600 g of methyl methacrylate. 0.24 g of methylhydroquinone (MEHQ) and 0.75 g of potassium phosphate were added and the reaction mixture was heated up at a bath temperature of 115° C. with introduction of air (0.3 L/h). A pressure of 600 mbar (abs.) was established and MMA with a fraction of methanol was distilled off continuously, in the course of which a liquid phase temperature at 85° C. to 86° C. was established. After 6 h, the reaction mixture was filtered through a pressure filter at max. 2 bar and concentrated under reduced pressure. Conversion was determined via 1H NMR as 2.5%.

Example 3

The reaction was effected in a 500 mL 4-neck round-bottom flask with oil bath heating, thermometer, reflux condenser, air inlet and half-moon Teflon stirrer. 145 g of a monoethoxylated phenol bearing a polyisobutene radical (prepared with 2-methylimidazole as catalyst according to example 9) which had been heated to 60° C. and 33 mg of tert-butylhydroxytoluene were initially charged at a bath temperature of 80° C. With introduction of air (about 0.3 L/h), at a temperature of 95° C., 18.9 g of methacrylic anhydride (94%, stabilized with Topanol® A) were added and the bath temperature was increased to 100° C. After 1.33 h, 80 mg of NaOH were added. After a total of 6 h, conversion was determined as >90% via TAI NMR. A further 1.6 g of methacrylic anhydride were metered in and the mixture was left to react at a bath temperature of 100° C. for a further 3 h. Conversion was now determined as >95% via TAI NMR.

111 g of the product were admixed with 3 g of n-butanol at 60° C., and the mixture was stirred for 1 h. The product phase was extracted 3× with 30 mL each time of methanol, and the methanolic phases were each removed and discarded. The product phase was concentrated under reduced pressure. The methacrylic acid content was 1% by weight; methacrylic anhydride is no longer found (determined via 1H NMR).

Example 4

The reaction was effected in a 500 mL 4-neck round-bottom flask with oil bath heating, thermometer, reflux condenser, air inlet and half-moon Teflon stirrer. 145 g of a monoethoxylated phenol bearing a polyisobutene radical (prepared with 2-methylimidazole as catalyst according to example 9) which had been heated to 60° C. and 33 mg of tert-butylhydroxytoluene were initially charged at a bath temperature of 80° C. With introduction of air (about 0.3 L/h), at a temperature of 95° C., 19.7 g of methacrylic anhydride (94%, stabilized with Topanol® A) were added. After 2.75 h, 80 mg of NaOH were added and the bath temperature was increased to 100° C. After a total of 5.5 h, the reaction was ended and the product at 80° C. was discharged.

Methacrylic acid was distilled out of the product under reduced pressure at 80° C. down to 2.2 mbar. The sample still comprised 2.3% methacrylic acid (determined via NMR). An about 50% solution in toluene was prepared. The solution was adjusted to a pH>12 with 32% aqueous NaOH and stirred at room temperature for 2 h. 10 g of Bentonit® and 10 g of Hyflo Super Cel® were added. This was followed by filtration through a pressure filter at max. 2 bar and concentration of the product under reduced pressure. Conversion was determined as >95% via TAI NMR. The methacrylic acid content was <0.25% by weight; methacrylic acid is no longer found (determined via NMR).

Example 5

The reaction with ethylene carbonate was effected with introduction of nitrogen (about 0.3 L/h) in a 750 mL jacketed reactor equipped with an anchor stirrer, a gas inlet, a separating column and a liquid divider. This apparatus was initially charged with 230.2 g of a phenol bearing a polyisobutene radical of molar mass 1000 obtained analogously to example A, 21.9 g of ethylene carbonate and 4.1 g of potassium phosphate, and was heated up at a bath temperature of 177-180° C., in the course of which there was evolution of $CO_2$. The internal temperature was 169-170° C. After 7.5 h, the mixture was cooled down to 60° C. 500 g of methyl methacrylate and 0.1 g of MEHQ were added. The reaction mixture was heated up at a temperature of 115° C. with introduction of air (about 0.3 L/h). A pressure of 600 mbar (abs.) was established and an azeotrope of methanol and methyl methacrylate was distilled off continuously, in the course of which a liquid phase temperature at 84° C. to 87° C. was established. The distillates were collected and analyzed for their methanol content. After the reaction had ended, the product was filtered through a pressure filter at max. 2 bar and the reaction mixture was concentrated under reduced pressure. Conversion was determined as >99% via TAI NMR.

Example 6

The transesterification was effected with introduction of air in a 750 mL jacketed reactor equipped with an anchor stirrer, an air inlet, a separating column and a liquid divider. This apparatus was charged with 990 g of a 29.3% solution of a monoethoxylated phenol bearing a polyisobutene radical according to example 9 (prepared with 2-methylimidazole as catalyst) in methyl methacrylate. 0.495 g of methylhydroquinone (MEHQ) was added and 150 mL of methyl methacrylate were distilled off with introduction of air at bath temperature 95° C. and a reduced pressure of 300 mbar abs.

150 mL of methyl methacrylate were added and the reaction mixture was heated up at a bath temperature of 120° C. at standard pressure with introduction of air (0.3 L/h). 2.3 g of tetraisopropyl titanate were added and an azeotrope of methanol and methyl methacrylate was distilled off continuously at a bath temperature of 125° C. and a reduced pressure of 700 mbar abs., in the course of which a liquid phase temperature of 90° C. is established.

After the reaction had ended, the reaction mixture was analyzed. Conversion was determined as 14% via TAI NMR.

Example 7

The reaction was effected in a 500 mL 4-neck round-bottom flask with oil bath heating, thermometer, reflux condenser, water separator, air inlet and half-moon Teflon stirrer. 145 g of a monoethoxylated phenol bearing a polyisobutene radical according to example 9 (prepared with 2-methylimidazole as catalyst) which had been heated to 60° C., 100 g of toluene, 10.3 g of methacrylic acid (stabilized with 200 ppm of MEHQ), 0.76 g of p-toluene sulfonic acid monohydrate and 49 mg of MEHQ were initially charged at a bath temperature of 80° C. The reaction mixture was heated up. At a bath temperature of 127° C., the mixture started to boil. The bath temperature was raised to 140° C. in the course of the reaction. A further 1.17 g of p-toluenesulfonic acid monohydrate were added. After a total reaction time of 4.5 h, no water had formed to any significant degree (about 0.2 mL of water). The reaction mixture was cooled down and then, at a liquid phase temperature of 95° C., 7.7 g of methanesulfonic acid and a further 5.1 g of methacrylic acid were added. The bath temperature was adjusted again to 140° C. Within a further 3 h of reaction time, a total of 72% of the expected amount of water was separated out, and no further water distilled over within a further hour (total reaction time then 8.5 h). The reaction was stopped.

Example 9

A phenol bearing a polyisobutene radical obtained analogously to example A (1 eq.) and ethylene carbonate (1.1 eq.) were mixed under a nitrogen atmosphere and heated up to 100° C. 2-Methylimidazole (0.6% by weight) was added and the reaction mixture was gradually heated up to 150° C. within 5 hours until no further evolution of gas was observed. From 140° C., discoloration of the reaction mixture from pale yellow to brown/black was observed. Conversion was monitored by means of $^1$H NMR spectroscopy.

Example 11

A phenol bearing a polyisobutene radical obtained analogously to example A (1 eq.) and ethylene carbonate (1.3 eq.) were mixed under a nitrogen atmosphere and heated to 170° C. Potassium phosphate (1.46 wt %) was added and the reaction mixture was stirred at 170° C. for 6 hours until no further evolution of gas was observed. No discoloration was observed. Conversion was monitored by means of $^1$H NMR spectroscopy.

Example 12

A phenol bearing a polyisobutene radical obtained analogously to example B (1 eq.) and ethylene carbonate (1.3 eq.) were mixed under a nitrogen atmosphere and heated to 110° C. Potassium phosphate (1.46% by weight) was added and the reaction mixture was stirred under reduced pressure at 120-170° C. for 48 h.

Conversion was monitored by means of $^1$H NMR spectroscopy.

Example 13

Transesterification was effected with introduction of lean air in a 4 L jacketed reactor equipped with a multilevel beam stirrer, a lean air inlet, a separating column and a liquid divider. This apparatus was charged with a solution of 450 g of a monoethoxylated phenol bearing a polyisobutene radical according to example 12 in 1500 g of methyl methacrylate. 0.13 g of methylhydroquinone (MEHQ) and 10.5 g of potassium phosphate were added and the reaction mixture was heated up at a bath temperature of initially 115° C. with introduction of lean air (0.5 L/h). A pressure of 600 mbar (abs.) was established and an azeotrope of methanol and methyl methacrylate was distilled off continuously, in the course of which a liquid phase temperature at 84° C. was established. The reflux ratio was 20:1 (reflux:efflux). The bath temperature was lowered to 110° C. in the course of the reaction. After the reaction had ended, the reaction mixture was filtered through a pressure filter at max. 2 bar and concentrated at bath temperature 75° C. under reduced pressure. 449 g of product were obtained. Conversion is determined as >99% via TAI NMR.

Homopolymerizations

Solution Polymerization

Polymerization Example 1

Polymerization was effected under a gentle nitrogen stream in a 4 L jacketed vessel with heating circuit, circulation pump, pilot stirrer, long jacketed coil condenser, anchor stirrer and stirrer motor. 98.17 g of the product from example 3 were initially charged in 391.32 g of orthoxylene and heated up to 80° C. At an internal temperature of 79° C., 0.26 g of tert-butyl acrylate (75%) in 19.63 g of ortho-xylene was metered in within 3 hours. The mixture was then heated up to 90° C. within 15 min, and 0.18 g of tert-butyl peroctoate in 19.63 g of orthoxylene was metered in within 30 min. Conversion was determined by means of $^1$H NMR as 55%. An $M_W$ of 27 700 g/mol (PDI=12.4) was determined by means of GPC (RI detector) and an $M_W$ of 25 000 g/mol by means of GPC (MALLS).

Miniemulsion Polymerization

Polymerization Example 2

21.5 g of the product from example 3 were first dissolved in 31.5 g of hexane. 70.88 g of water and 3.68 g of Disponil® FES 27 were premixed in a 250 mL vessel and the macromonomer solution was added gradually. The preemulsion formed was further emulsified with vigorous stirring for 50 min. Subsequently, the preemulsion was treated at the highest level with an ultrasound probe at 400 W and 24 kHz for 2 min. This cooled the emulsion. The miniemulsion was then introduced into a 250 mL stirrer apparatus and inertized by a nitrogen stream at 150 rpm for 10 min. The internal temperature was adjusted to 70° C., and 2.15 g of 10% Cert-butyl hydroperoxide solution were added. Subsequently, 17.2 g of a 2% sodium acetonebisulfite solution were metered in with a feed time of 3 hours.

The molar mass ($M_W$) of the dispersion obtained was determined by means of GPC (RI detector) as 293 000 g/mol and GPC (UV 275 nm) as 326 000 g/mol.

The molar mass ($M_n$) of the dispersion obtained was determined by means of GPC (RI detector) as 5720 g/mol and GPC (UV 275 nm) as 6590 g/mol. The low $M_n$ values are attributable here to residual monomers.

Copolymers

Polymerization Example 3

30 g of the product from example 3 and 30 g of methyl methacrylate were initially charged in 207 g of toluene and heated up to 80° C. 5% of a solution of 4 g of tert-butyl pivalate (75%) in 37.33 g of toluene were metered in within one minute and stirred (150 rpm) at 80° C. for 10 min, before the remaining 95% of the solution were metered in within 4.5 hours. After the metered addition had ended, the mixture was stirred at 80° C. for a further 1.5 hours.

Polymerization Example 4

45 g of the product from example 3 and 15 g of methyl methacrylate were initially charged in 207 g of toluene and heated up to 80° C. 5% of a solution of 4 g of tert-butyl pivalate (75%) in 37.33 g of toluene were metered in within one minute and stirred (150 rpm) at 80° C. for 10 min, before the remaining 95% of the solution were metered in within 4.5 hours. After the metered addition had ended, the mixture was stirred at 80° C. for a further 1.5 hours.

The invention claimed is:

1. A process for preparing a compound (A) of the formula (I)

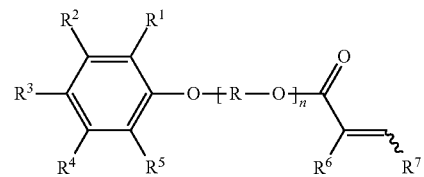

in which
$R^1$ to $R^5$ are each independently selected from the group consisting of hydrogen, $C_1$-$C_{20}$-alkyl, $C_1$-$C_{20}$-alkyloxy and $C_5$-$C_{3500}$-polyisobutyl and $C_5$-$C_{3500}$-polyisobutenyl,
R is an alkylene group having 2 to 10 carbon atoms,
$R^6$ is hydrogen or methyl,
$R^7$ is hydrogen, methyl or $COOR^8$,
$R^8$ is hydrogen or $C_1$-$C_{20}$-alkyl and
n is a positive integer from 1 to 50,
with the proviso that
at least one of the $R^1$ to $R^5$ radicals is a $C_5$-$C_{3500}$-polyisobutyl or $C_5$-$C_{3500}$-polyisobutenyl,
and is derived from polyisobutene having a content of terminal double bonds of at least 50 mol %, based on the total number of polyisobutene macromolecules, wherein phenols of the formula

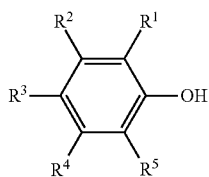

are reacted with alkylene carbonates of the formula

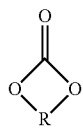

followed by a decarboxylation and subsequent esterification with (meth)acrylic acid, crotonic acid, fumaric acid, maleic acid or maleic anhydride, or by transesterification with (meth)acrylic esters, crotonic esters, fumaric esters or maleic esters.

2. The process as claimed in claim 1, wherein the alkylene carbonate is selected from the group consisting of 1,2-ethylene carbonate, 1,3-propylene carbonate and 1,2-propylene carbonate.

3. The process as claimed in claim 1, wherein the stoichiometry of 1 to 2 mol of carbonate:1 mol of phenol.

4. The process as claimed in claim 2, wherein the stoichiometry of 1.2 to 1.5 mol of carbonate:1 mol of phenol.

5. The process as claimed in claim 1, wherein the catalyst is selected from the group consisting of an inorganic salt, tertiary amine, triphenylphosphine, lithium hydride and organic stannate.

6. The process as claimed in claim 1, wherein the reaction is carried out at a temperature of 70 to 200° C.

7. The process as claimed in claim 1, wherein the reaction is carried out at a temperature of 150 to 170° C.

8. The process as claimed in claim 1, wherein the esterification with (meth)acrylic anhydride in the presence of at least one basic catalyst.

9. The process as claimed in claim 1, wherein the transesterification with $C_{1-4}$ alkyl ester is a methyl ester, ethyl ester, n-propyl ester, isopropyl ester, n-butyl ester, sec-butyl ester, isobutyl ester or tert-butyl ester.

10. A fuel additive or a lubricant additive which comprises a copolymer comprising, in polymerized form,
at least one compound (A) of the formula (I)

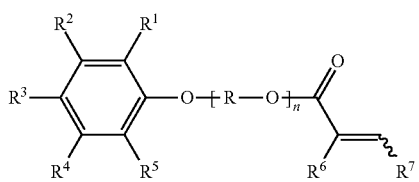

in which
$R^1$ to $R^5$ are each independently selected from the group consisting of hydrogen, $C_1$-$C_{20}$-alkyl, $C_1$-$C_{20}$-alkyloxy and $C_5$-$C_{3500}$-polyisobutyl and $C_5$-$C_{3500}$-polyisobutenyl, R is an alkylene group having 2 to 10 carbon atoms,
$R^6$ is hydrogen or methyl,
$R^7$ is hydrogen, methyl or $COOR^8$,
$R^8$ is hydrogen or $C_1$-$C_2O$-alkyl and
n is a positive integer from 1 to 50,
with the proviso that
at least one of the $R^1$ to $R^5$ radicals is a $C_5$-$C_{3500}$-polyisobutyl or $C_5$-$C_{3500}$-polyisobutenyl,
and is derived from polyisobutene having a content of terminal double bonds of at least 50 mol %, based on the total number of polyisobutene macromolecules,
and at least one monomer (B) selected from the group consisting of
(B1) (meth)acrylates other than (A),
(B3) alkyl vinyl ethers
(B4) styrene and α-methylstyrene and
(B7) (meth)acrylamides.

11. The fuel additive or the lubricant additive as claimed in claim 10, wherein the monomer (B1) is methyl (meth)acrylate, ethyl (meth)acrylate, isopropyl (meth)acrylate, n-propyl (meth)acrylate, n-butyl (meth)acrylate, isobutyl (meth)acrylate, sec-butyl (meth)acrylate, tert-butyl (meth)acrylate, n-hexyl (meth)acrylate, n-heptyl (meth)acrylate, n-octyl (meth)acrylate, n-decyl (meth)acrylate, n-dodecyl (meth)acrylate, n-tetradecyl (meth)acrylate, n-hexadecyl (meth)acrylate, n-heptadecyl (meth)acrylate), n-octadecyl (meth)acrylate, n-eicosyl (meth)acrylate, 2-ethylhexyl (meth)acrylate and 2-propylheptyl (meth)acrylate, particular preference to methyl (meth)acrylate, ethyl (meth)acrylate, n-butyl (meth)acrylate, tert-butyl (meth)acrylate and 2-ethylhexyl (meth)acrylate.

12. The fuel additive or the lubricant additive as claimed in claim 10, wherein the proportions of compound (A) in the polymer in polymerized form is at least 1% by weight.

13. The fuel additive or the lubricant additive as claimed in claim 10, wherein the proportions of compound (A) in the polymer in the polymerized form is at least 1% by weight up to 100% by weight but without 100% (the homopolymer).

14. The fuel additive or the lubricant additive as claimed in claim 10, wherein the molecular weight as listed in mass-average molecular weight Mw of the polymers obtained is 5,000 g/mol or more.

15. The fuel additive or the lubricant additive as claimed in claim 10, wherein the molecular weight as listed in mass-average molecular weight Mw of the polymers obtained is 5,000 g/mol up to 1,000,000 g/mol.

16. The fuel additive or the lubricant additive as claimed in claim 10, wherein exactly one of the $R^1$ to $R^5$ radicals is C8-C3500-polyisobutyl or C8-C3500-polyisobutenyl.

17. The fuel additive or the lubricant additive as claimed in claim 10, wherein $R^3$ is a C8-C3500-polyisobutyl or C8-C3500-polyisobutenyl radical and the other radicals are not.

18. The fuel additive or the lubricant additive as claimed in claim 10, wherein the $R^1$ to $R^5$ radicals that are not a polyisobutyl or polyisobutenyl radical are selected from the group consisting of hydrogen, methyl and tert-butyl.

19. The fuel additive or the lubricant additive as claimed in claim 10, wherein R is selected from the group consisting of 1,2-ethylene, 1,2-propylene, 1,2-butylene, 1-phenyl-1,2-ethylene and 2-phenyl-1,2-ethylene.

20. The fuel additive or the lubricant additive as claimed in claim 10, wherein n is 1.

* * * * *